United States Patent [19]
Login et al.

[11] Patent Number: 5,799,281
[45] Date of Patent: Aug. 25, 1998

[54] COMPUTER CONTROL AND MANAGEMENT SYSTEM FOR LAUNDRY INSTALLATION

[75] Inventors: Gary R. Login; Ronald B. Wilkinson, both of Brookline, Mass.

[73] Assignee: E.L.M.S., LLC, Brookline, Mass.

[21] Appl. No.: 590,186

[22] Filed: Jan. 23, 1996

[51] Int. Cl.$^6$ .................................................. G06F 9/00
[52] U.S. Cl. .................................. 705/1; 364/400; 705/400
[58] Field of Search ...................... 705/1, 400; 364/400

[56] References Cited

U.S. PATENT DOCUMENTS

| | | | |
|---|---|---|---|
| 4,084,237 | 4/1978 | Beachem et al. | 364/400 |
| 4,114,190 | 9/1978 | Mazuir | 364/900 |
| 4,245,310 | 1/1981 | Kiefer | 364/400 |
| 4,330,081 | 5/1982 | McMillan | 236/12 |
| 4,418,333 | 11/1983 | Schwarzbach et al. | 340/310 |
| 4,531,826 | 7/1985 | Soughton et al. | 355/14 |
| 4,999,763 | 3/1991 | Ousbourne | 364/140 |
| 5,225,977 | 7/1993 | Hooper et al. | 364/401 |
| 5,280,423 | 1/1994 | Imai et al. | 364/140 |
| 5,313,393 | 5/1994 | Varley et al. | 364/403 |
| 5,386,362 | 1/1995 | Keret | 364/406 |
| 5,390,385 | 2/1995 | Beldham | 8/158 |
| 5,412,291 | 5/1995 | Payne et al. | 318/102 |
| 5,424,940 | 6/1995 | Ousbourne | 364/140 |
| 5,586,174 | 12/1996 | Bogner et al. | 379/106 |
| 5,694,323 | 12/1997 | Koropitzer | 705/400 |

OTHER PUBLICATIONS

Griffin Technology Manual diagrams, "Machine Interface Device (MID)" 4–1, 4–2 and 4–3.

*Primary Examiner*—Edward R. Cosimano
*Assistant Examiner*—Phillip Groutt
*Attorney, Agent, or Firm*—Hamilton, Brook, Smith & Reynolds, PC

[57] ABSTRACT

The present invention relates to a computer-automated laundry management system which is designed to improve access, control operation, record activities, and monitor multiple laundry machines in a facility. The automated system provides a user interface, an account manager, and a local machine controller. The invention can be retrofitted to domestic and commercial laundry machines (washers and dryers) with simple modification of the laundry machines. The system also uses a modem to provide remote functions such as notifying customers when the laundry service is completed as well as remote monitoring and accounting. The invention emphasizes software control to provide a highly flexible, feature-rich, and an easily adaptable functionality at a significantly lower cost than hardware-centered implementations.

20 Claims, 20 Drawing Sheets

INPUT DEVICES 200

Keypad 202
Touch Screen 204
Mouse 206
Glide Point 208
Track Ball 210
Magnetic Card Reader 212
Bar Code Reader 214
Smart Card Reader 216
Touch Tone Phone 218

DISPLAY/NOTIFICATION DEVICES 220

CRT, LCD, Plasma Monitors 222
Voice Telephone 224
Local Speakers 226
FAX 228
Pagers 230
Electronic Mail 232

CONTROLLABLE MACHINES 234

Commercial Washer 236
Commercial Dryer 238
Domestic Washer 240
Domestic Dryer 242
Vending Machines 244
Exercise Machines 246
Other Appliances 248

MODES OF BILLING 250

Prepaid Debit Accounts 252
Invoiced Accounts 254
Major Credit Card Charges at Point of Sale 256
Creative, Flexible Billing and Rate Structures 258
Non-Fee Oriented Access Control 260

MODES OF INTERACTION 262

Visual: Text or Graphics 264
Synthesized or Recorded Speech 266
Multiple Languages 268

FIG. 2

STEP 1: Identification of 'Cycle Active' Circuit

— Refer to schematic of laundry machine's control panel to identify circuits that determine if cycle is active ( i.e., the ON light).
— Unplug machine and open laundry machine control panel.

STEP 2: Voltage Detection at the ON Circuit

— Identify the four wire leads from the MIM (Fig. 5A)
— Splice the wire labelled sensor 1 to the high voltage side of the ON Circuit (Fig. 4B).
— Splice wire labelled power sensor 2 on the open side of the ON Circuit (Fig. 4B).

STEP 3: Controlling Line Power

— Identify the four wire leads from the MIM (Fig. 5A).
— Cut the power cord before it enters the power switch.
— Splice the wire labelled power line 1 to one cut end of the power cord (Fig. 4A).
— Splice wire labelled power line 2 to the other cut end of the power cord (Fig. 4A).
— Secure the MIM in the control panel.

STEP 4: Low Voltage Wiring

— Plug one end of the phone cord into the RJII connector on the MIM (Fig. 5A)
— Plug the other end of the phone cord into the RJII connector on the CIM (Fig. 5B) (Up to 150 feet between MIM and CIM).
— Plug additional phone cords between the MIM and CIM in numeric order.

FIG. 3A

STEP 5: Mount the Digital I/O board in the Computer

STEP 6: Connect the CIM to the Digital I/O board
— Plug the female end of the DB-37 pin connector from the CIM into the digital I/O board STEP 7: Connect the Five Volt Power Supply
— Plug the five pin DIN connector from the five volt power supply into the CIM (Fig. 5B).

STEP 8: Plug the devices into 120 Volt Wall Power
— Plug the power cords from the computer and power supply into the wall outlets.
— Plug the power cords from the laundry machines into the wall sockets.
— Turn on the computer.

FIG. 3B

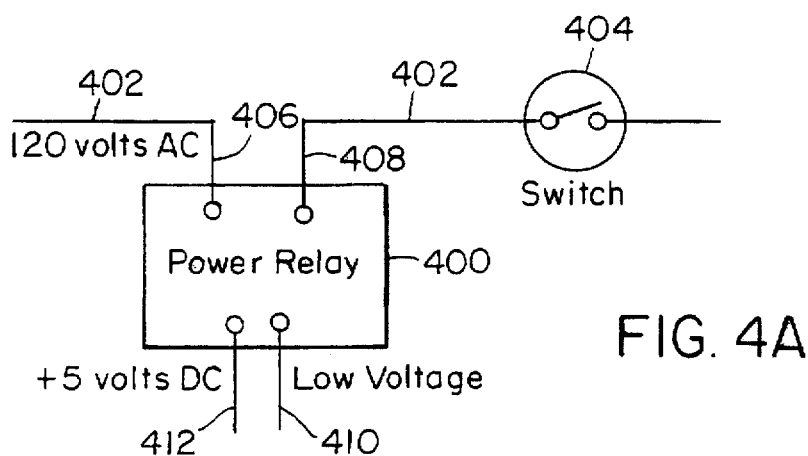

FIG. 4A

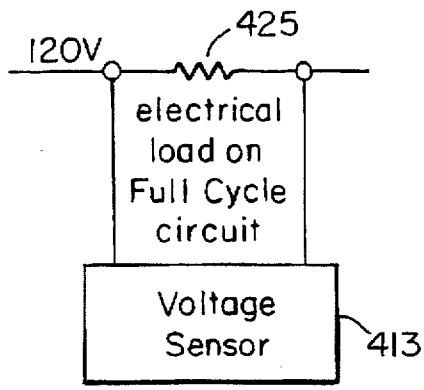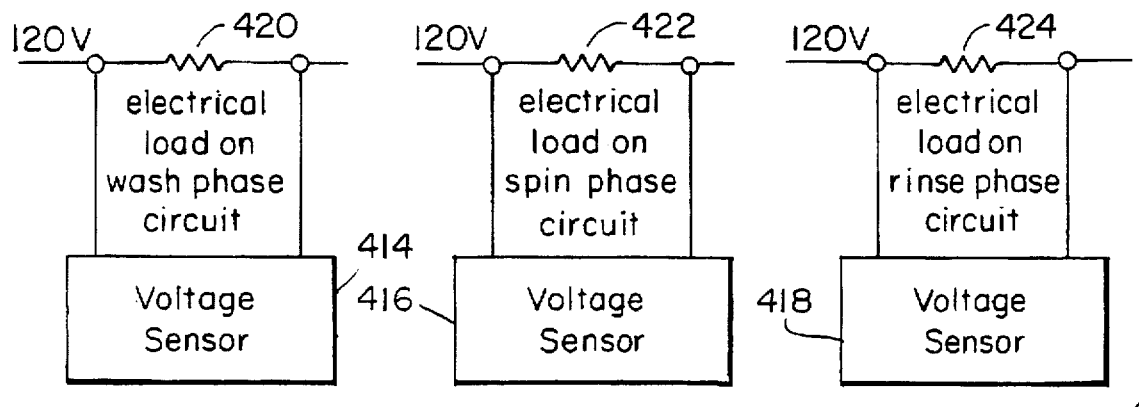
FIG. 4B

COMPUTER CONTROL AND MANAGEMENT SYSTEM FOR LAUNDRY INSTALLATION

BACKGROUND OF THE INVENTION

Laundry machines in public facilities are typically activated by payment of coins into a device located on each laundry machine. More recently computer controlled access and payment systems (i.e., debit cards) are being used. Both forms of the prior art have important disadvantages.

Many public laundry facilities provide bill changers which dispense coins for the convenience of the user. The number of coins of the correct denomination activate the machines for a number of cycles of operation. Coins in the laundry machine's or bill changer's coin boxes are regularly collected by an agent of the facility.

There are several disadvantages to this method of paying for the operation of the laundry service machines. A large number of coins are accumulated at each machine. This ties up operating capital for the owner of the facility. In addition, the presence of a large amount of coins on the premises makes the facility a target for theft and vandalism. Furthermore, the task of collecting the coins is time consuming. This collection time increases the cost of operating the facility.

Each laundry machine is fitted with a mechanical device for accepting coins. The cost of a mechanical coin collecting device can add 50% to the initial cost of purchasing the laundry machine. If an owner wishes to change the cost of a machine cycle, the coin box on each laundry machine must be modified manually. Additionally, the use of coins, typically quarters, limits the flexibility of the facility owner to setting the cost of machine cycles in quarter dollar increments. Smaller currency increments require more frequent collections and quarter increases may not be competitive with other facilities.

Other disadvantages of coin-operated, commercial laundry machines are customer dissatisfaction with the appearance of coin boxes and the lack of convenience features found on domestic laundry machines.

Computer controlled laundry equipment eliminates the need for coin-operated laundry, increases flexibility of rate setting, and provides improved record keeping. However, currently available computer systems have several limitations such as: a) a major investment in specialized computer hardware, b) replacement of computer hardware devices to expand features, and c) application to commercial but not domestic laundry machines models. We next describe these limitations in more detail.

Prior art computer controllers for laundry machines are costly. Built-in computer controllers in new electronic laundry machines are double the cost of standard mechanically controlled laundry machines. Electronic audit devices designed for these electronic laundry machines further increase costs by requiring route vendors to invest in additional hardware and by requiring personnel to be on-site to do the auditing of these machines. Even less expensive retrofitted devices such as self-contained card readers which replace the coin box increase the cost of the laundry machine by 50%. Card access technology further requires card encoders and dollar bill collection stations which increases the cost of the total system. In general, prior art computer systems are priced for large laundry operations (i.e., >20 machines in a room) and they do not offer an economic solution for providing computer automation to small laundry facilities (i.e., 3–5 machine pairs) in residential (e.g., rental, condominium) and institutional markets (e.g., nursing home communities).

Prior art computer systems in laundry machines are "closed architecture" devices that must be replaced to add new functionality. Therefore, a change in hardware is required to upgrade services. Furthermore, these computer systems are designed for specific models of laundry machines. None are made to work with domestic, cam-operated or mechanical washing machines.

Domestic, cam-operated washing machines are mass produced in quantities ten to one hundred times greater than washing machines with alternative control mechanisms (e.g., coin-operated and electronic controls) they are the least expensive and most readily available type of washing machine. In addition, domestic laundry machines offer a wider range of conveniences and money saving features than commercial laundry machines such as customer selectable water levels and variable washer and dryer cycles.

A continuing need exists for providing a computerized system which could be easily and inexpensively installed on domestic, cam-operated laundry machines with the purposes of providing convenience of payment methods, controlling access, remote auditing and servicing, and the opportunity to add new features for the customer and the management company without the need for changing hardware.

SUMMARY OF THE INVENTION

The present invention relates to a centralized, reconfigurable, computer controller that is designed to work in a retrofittable manner with the mechanical cam-drive controllers in domestic and commercial laundry equipment. Typical of such controllers are those having a manually rotatable dial marked such that various sectors of the dial identify various distinct wash programs or cycles. Such dials are often fixed to rotatable shafts on which a plurality of cams engage a gang of individual switches for controlling various mechanisms and subsystems within the machine. Once the dial is manually rotated to the operator-selected sector, a timer motor which drives the dial shaft and cams through that section is engaged. In this manner, the steps defined by portions of the cams in that dial sector are performed by the laundry machine.

A preferred embodiment of the invention includes a computer system that controls power at the electrical outlet and monitors the laundry machine's voltage at the cycle's on circuit. This interface between computer and laundry machine eliminates the need for a separate microprocessor controller in the laundry machine. In addition, the invention eliminates the need for coin-operated payment, increases flexibility of rate setting and provides improved record keeping and auditing data which can be monitored remotely. The invention has a highly reconfigurable architecture which enables new features to be added through changes in software. Examples of features that can be provided by this invention are an automated callback feature which lets the customer know when his or her laundry machine has completed its cycle, call-ahead laundry machine reservations via telephone, and visual and audio information about laundry machine use for multilingual communities and handicapped patrons.

The management system uses a standard personal computer (it is also adaptable to other widely available computer architectures capable of performing real time digital input and output), proprietary software, and digitally controlled sensors and relays to monitor voltage and turn power-on and off at standard 120 volt (or 240 volt) and 20–40 amp outlet(s). Any number of input devices such as a keypad, magnetic stripe card reader, bar code reader, or touch screen can be configured to give the customer access to the automated controller. A display screen shows the user which machines are available for use, the time remaining on those machines in operation, machine charges, and if appropriate, user account balance. The account manager software responds to a received request, instructs the user to identify the machine he or she has selected for use, debits the user's account and turns on power to the laundry machine's outlet. The user operates the laundry machine in the standard way (e.g., start button). The machine control is accessible to the customer via a local input device (i.e., keypad) and also to the management company via modem. The system can be one of many such systems in a network controlled by a server and can include software and printer systems for displaying and printing user account summaries and billing invoices.

BRIEF DESCRIPTION OF DRAWINGS

FIG. 2 shows how a standard personal computer permits flexible configurations.

FIG. 3 lists a sequence of steps in a method for installing the invention in a laundry machine.

FIG. 4a shows the wiring diagram to connect the digital power relay to the laundry machine power control circuit.

FIG. 4b shows the wiring diagram to connect single and multiple sensors to circuits controlling various phases in the laundry machine cycle.

DETAILED DESCRIPTION OF THE INVENTION

Figure 1:
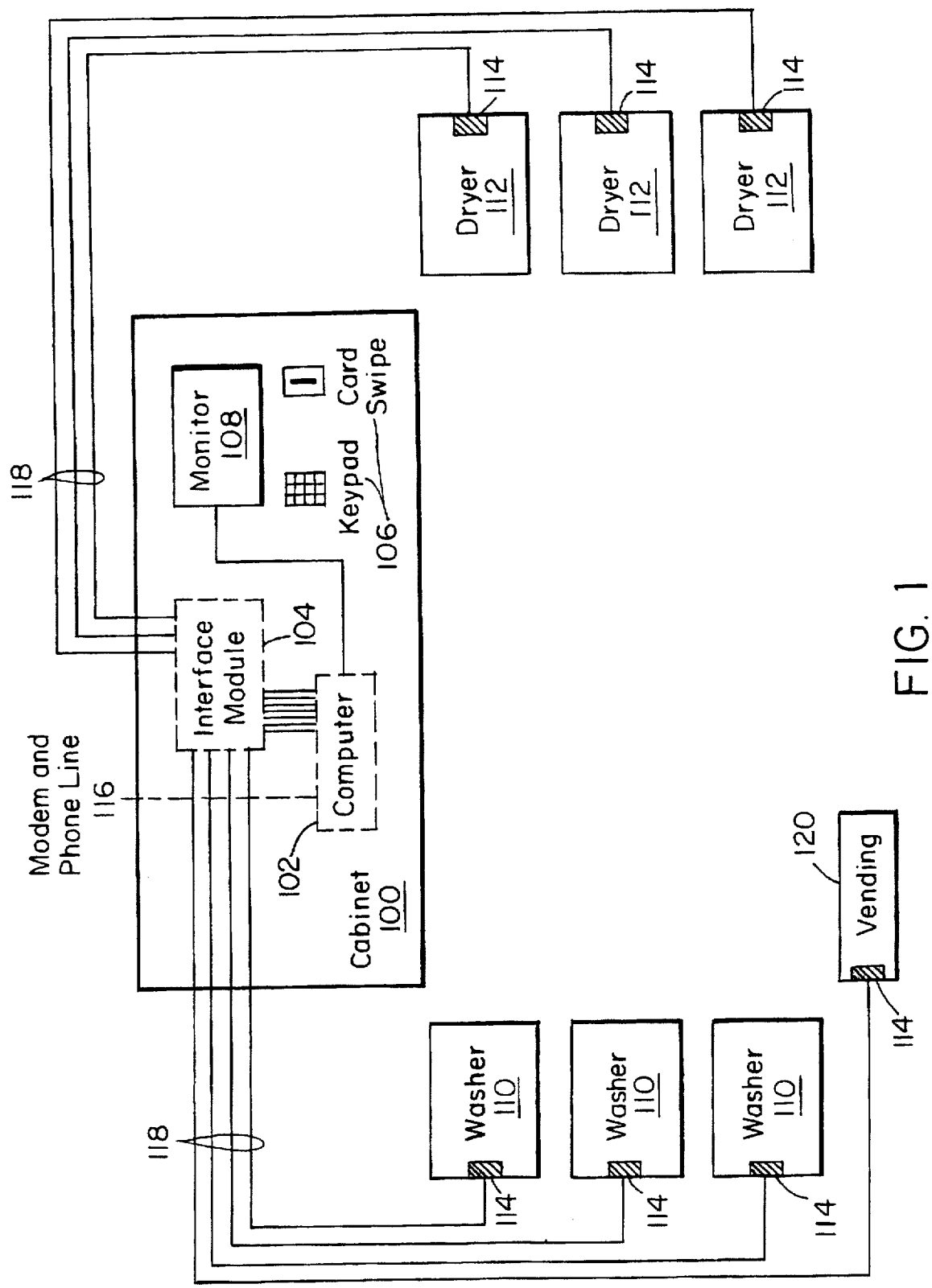
FIG. 1 schematically illustrates a sample layout of a public laundry facility with the computer automated system.

As shown in FIG. 1, a preferred embodiment of the self service laundry room controller provides controlled access to multiple laundry machines including washing machines 110, dryers 112, and vending machines 120. The invention can be realized as a computer 102 and a computer interface module (CIM) 104 connected by wires 118 to local machine interface modules (MIM) 114. The entire invention is located in the laundry room and the computer 102, and computer control devices 102, 104, 106, 108, 116 are located in a kiosk, cabinet or wall mounted safe-box 100, or in an equipment room.

Access to the computer's system unit 102 is provided by an on site customer station 106 on or within a cabinet 100 or mounted on a wall. The station 106 also includes a display 108, a computer interface module (CIM) 104 and an input device 106 such as a keypad or card swipe. Access to and modification of this information can also be provided at any remote operator terminal/computer via a modem 116 connected to both the computer's system unit 102 at the laundry room and a telephone line. The remote site operator station must be provided with a modem connected to a computer or terminal and telephone line.

An embodiment with one input device 106 (i.e., a numeric keypad), a CIM 104 for three washer-dryer pairs 110, 112, and a modem 116 for remote access has been implemented on the following hardware contained in a cabinet 100:

A personal computer;

RAM space that is 512K or more;

A standard operating system;

A monochrome or color video display adapter and monitor;

One floppy diskette and one hard drive;

A serial port for the modem;

A parallel port for the number pad input device;

A multichannel, high current, digital input/output board;

Solid state sensors;

Solid state power relays;

A modem (1200 baud) and a telephone line;

Commercially available, high security remote communications software.

FIG. 2 shows the flexibility of the architecture of the invention. A plurality of input devices 200 can be used by a laundry patron or service person to operate the system. The installation of a particular input device by the management company is based on the particular needs of the patron population. Keypads 202 are common input devices familiar to most people; however, touch screens 204, mouse control 206, glide point 208, and track balls 210 may offer certain advantages to special needs customers. Other input devices such as magnetic card readers 212, bar code readers 214, and smart card (with embedded computer chips) readers 216 enable management companies to offer their customers a variety of laundry payment and machine access methods. Touch tone phone 218 access offers customers remote access to laundry machines such as call-ahead laundry machine reservations. More powerful computers (e.g., 486-based personal computers) and operating systems permit more hardware and software options.

A plurality of display and notification devices 220 also increase the usefulness of the invention over the prior art. Reconfigurable software permits the use of CRT 222, LCD 222, and plasma display 222 monitors at the laundry room and management sites. Decisions to use any one of these devices is based on cost, security, and features. For example, standard dot matrix displays are the most affordable but provide the patron with the least information. Text and graphic screens are more expensive displays but offer the flexibility for the management company to provide company logos, announcements, and commercial information. In addition to visual displays, notification can also be done by voice telephone 224 and local speakers 226 for the visually impaired patron. Also, facsimile 228, pagers 230, and E-mail 232 notification can be used in certain business and residential settings.

The invention permits operation, management, and remote auditing of a variety of machines 234 such as commercial washers 236 and dryers 238, domestic washers 240 and dryers 242, vending machines 244, electric powered exercise machines 246, and other appliances 248 such as photocopy and facsimile machines, and televisions.

The architecture of the invention permits a plurality of modes of billing customers 250. Prepaid debit accounts 252, invoiced accounts 254, and card accounts 256 (e.g., credit cards, proprietary cards) facilitate the management of a coin-less laundry facility. In addition, the invention permits access control of non-fee oriented services 260 such as exercise equipment. Reconfigurable software permits creative, flexible billing and rate structures 260 such as senior citizen discounts.

FIG. 2 also shows various potential modes of interaction 262 between the patron and the invention depending on the configuration of the software and the peripheral devices. Information can be communicated by visual means (text or graphics) 264 and by speech (synthesized or recorded) 266 in any language 268 which can be selected by the customer.

FIG. 3 describes the installation steps of the invention. In step 1 the domestic or commercial laundry machine's control panel is opened and with reference to the electrical schematic the cycle active circuit is identified. Identification and connection to typical types of cycle active circuits are described in greater detail in FIG. 4b. In step 2 the voltage sensing circuit (FIG. 5a) is connected by splicing the wire labelled sense #1 on the high voltage side of the ON circuit and by splicing the wire labelled sense #2 on the open side of the ON circuit. In step 3, the line power circuit (described in FIG. 4a) is connected by cutting the high voltage side of the line power cord before it enters the power ON switch. The wire labelled power line #1 from the power relay (FIG. 5a) is connected to one of the cut ends of the power cord. The wire labelled power line #2 is connected from the power relay (FIG. 5a) to the other cut end of the power cord. In step 4, a low voltage wire is connected between the laundry machine control panel and the CIM (FIG. 5b). Alternatively, the high voltage power control and sensor wires can be extended from the laundry machine control panels and connected to the CIM (i.e., in which case the power relays and sensors are in a master control module (MCM) near the computer, FIG. 5c). In step 5, a digital I/O board is installed into an open slot inside a standard personal computer. In step 6, the cable connection between the CIM and the digital I/O board is made. In step 7, the 5 volt power supply is connected to the CIM (FIG. 5b). In step 8, the laundry machine(s) and the 5 volt power supply are plugged into 120 volt wall outlets. The computer is plugged into a 120 volt outlet equipped with a protective power line filter.

FIG. 4 shows how the invention activates and monitors laundry machines with various types of cycle active circuits. In FIG. 4a, the high voltage terminals of the power relay 400 are connected by wires 406, 408 to the power cord 402 in series with the laundry machine's ON switch 404. Laundry machines with electronic control panels can be activated directly by a low voltage digital signal 410, 412 from the computer's system unit 102, eliminating the need for a power relay 400. A low voltage wire from the computer 410, 412 replaces the electronic ON switch. The invention's software-controlled low voltage signal mimics the electronic ON switch. In a similar fashion, computer-controlled high or low voltage can be applied in parallel to the coin box mechanism's ON circuit to provide dual means of access (computer or coin) to coin-operated laundry machines.

FIG. 4b shows how the sensors are connected to washing machines with one or more cycle-active circuits. The sensors 413, 414, 416, 418 are connected in parallel with circuits controlling various cycle phases such as indicator lights for the wash cycle 420, spin cycle 422, and/or other cycle(s) (i.e., rinse cycle 424). In machines in which no indicator lights are present, the sensor is connected to a portion(s) of the circuit in which the power is maintained until the entire laundry cycle is complete 425. Therefore, the computer 102 senses the power-on and maintains power to the one hundred twenty volt outlet. When the laundry cycle is completed, power to the laundry machine's cycle circuit turns off (e.g., via the cam control) and this drop in voltage is detected by the sensor 413, 414, 416, 418 which changes the state of a bit assignment in the digital I/O board. The software is programmed to turn the power relay off when it detects this change of state.

In common domestic and commercial washing machines, the power is applied from an input terminal via an on/off switch, water level switch, lid switch, and reversing relay switch to the motor windings. The on/off switch can be activated by the computer when following two conditions are met: a) a patron selects a valid account (FIG. 8) and b) when the mechanical cam cycle is rotated to the beginning of a wash cycle (or the coin slide is activated, or the ON button on the laundry machine control panel is activated). For washers in which the power-on switch can be operated independently of the wash cycle switch, the computer can be made to control the power directly without human assistance. Otherwise, the customer must operate the machine's power-on switch in addition to the computer activation. Once power to the washer is turned on it is maintained until the end of the laundry cycle at which time the washer turns off. Thus the invention permits all the functionality provided by the laundry machine's control panel and simply controls patron access.

Figure 11A:
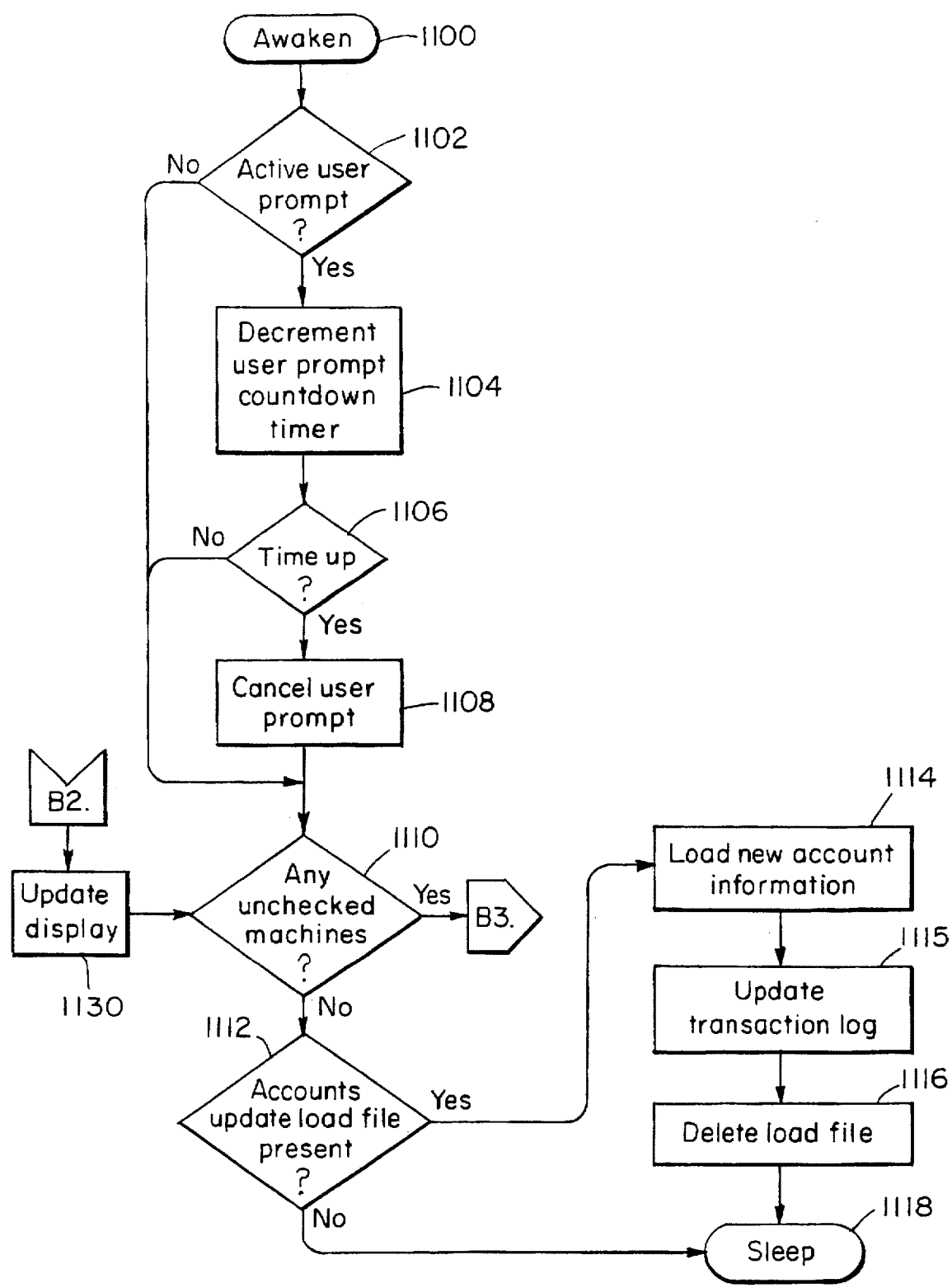
FIG. 11 shows a flow chart illustrating a timed-interval polling method for checking laundry cycle status in a software program controlling laundry machines through the machine and computer interface modules.
Figure 11B:
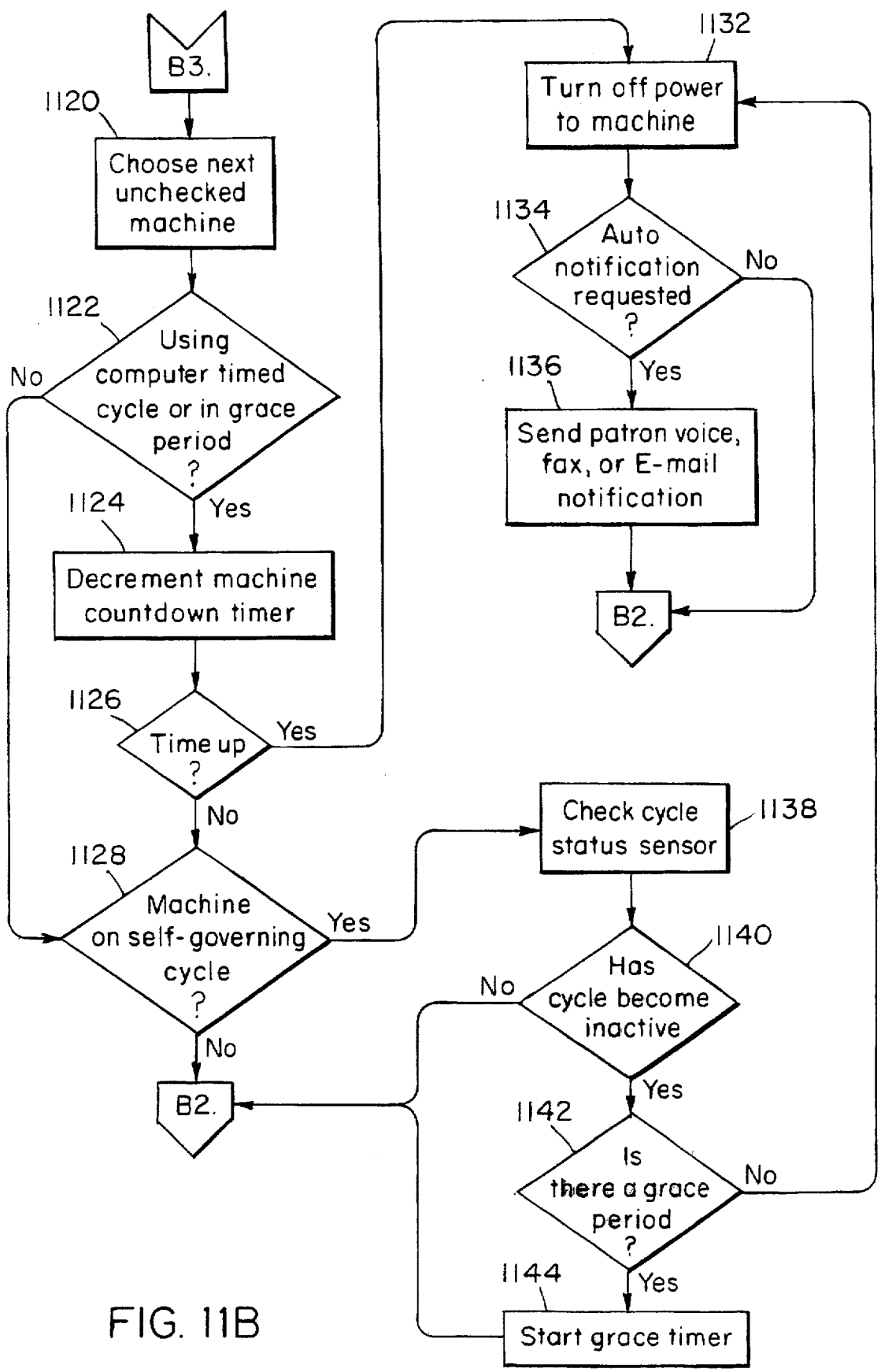

The invention can work differently with a dryer than with a washing machine. Most models of dryers automatically shut off all power to their control panel when the door is open. Therefore, the software provides a total dryer cycle time (e.g., sixty minutes) and then automatically shuts power off to the outlet. If the dryer cycle is interrupted (i.e., by opening the dryer door before the end of the full cycle) the voltage sense module detects that voltage to the dryer's internal circuit is off (FIG. 4b). When the computer 102 determines a power-off condition before the sixty minute cycle time has decremented to zero, then the computer 102 initiates a grace period timer (FIG. 11). In order to allow the patron to continue his/her dryer cycle, the software instructs the computer to maintain power to the dryer's outlet during a grace period (e.g., five minutes). The patron can restart the dryer by closing the door and pressing the dryer's on switch during the grace period to resume dryer operation. Power to the dryer's outlet is automatically turned off by the computer when either the grace period or the cycle time decrement to zero. Therefore, this unique configuration of the invention uses a power relay and a voltage sensor to shut the machine off prior to the end of its timed cycle. The advantage of this approach is increased patron access to laundry machines with fixed timed cycles.

Figure 5A:
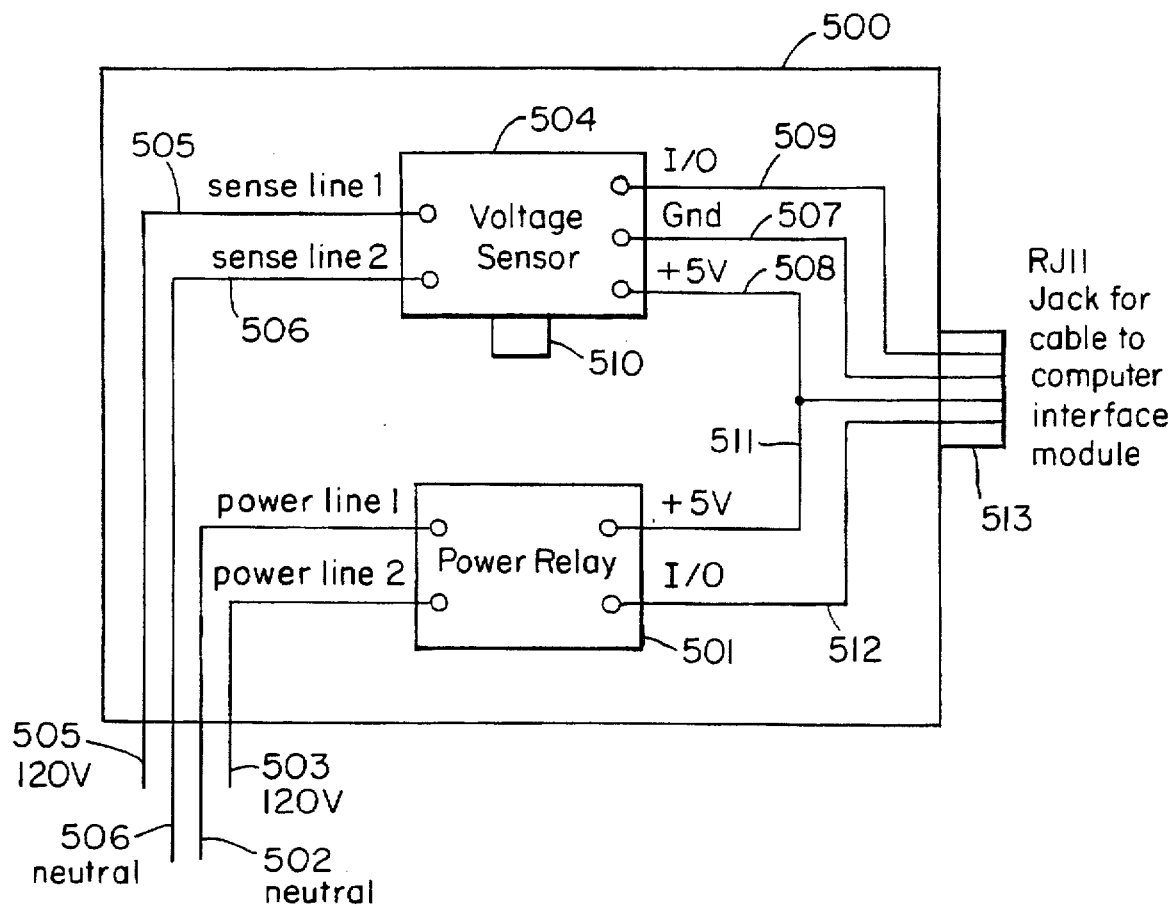
FIG. 5a shows the wiring diagram for the machine interface module (MIM).
Figure 5B:
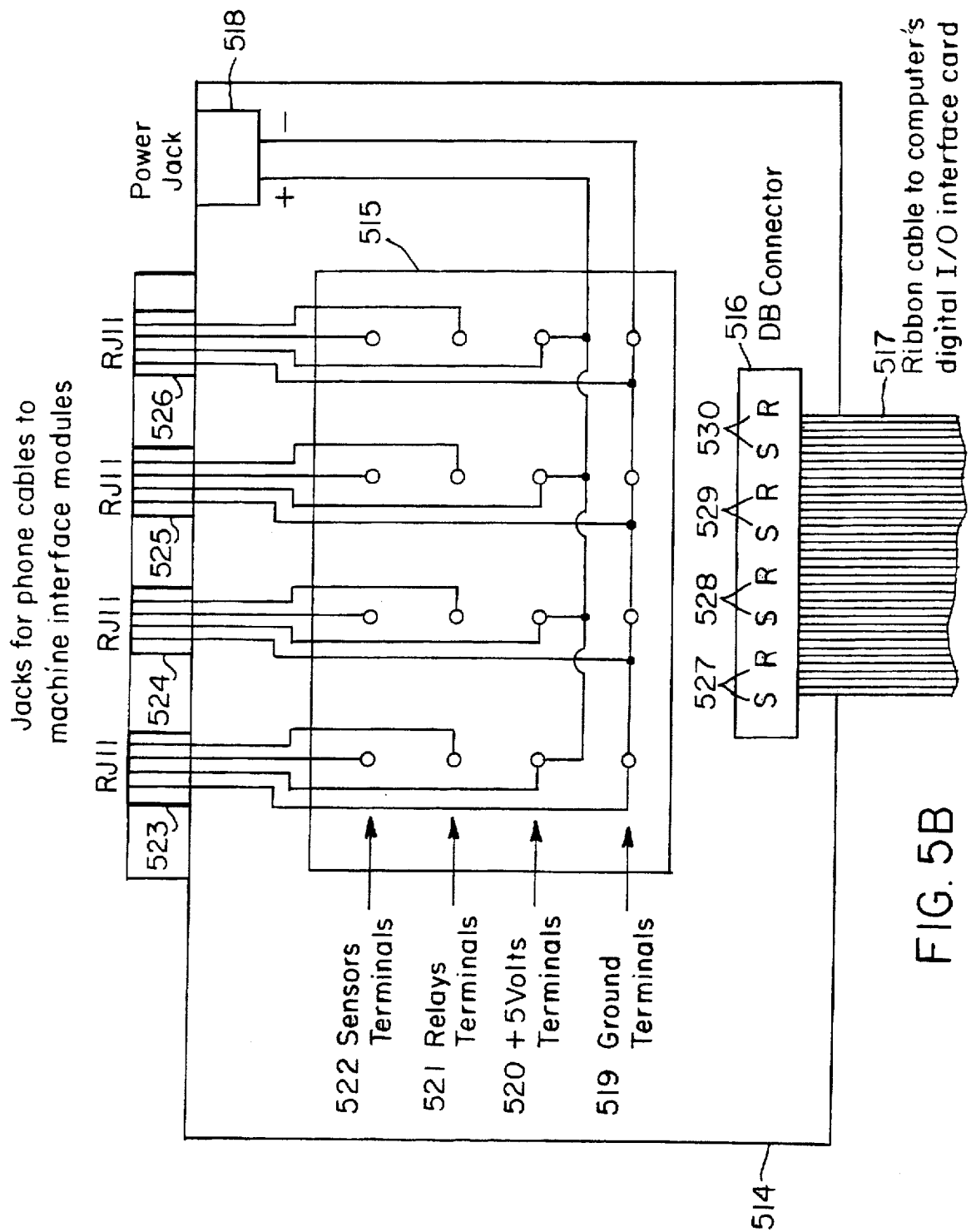
FIG. 5b shows a wiring diagram for a computer interface module (CIM).

In FIG. 5a the machine interface module (MIM) 500 contains one voltage sensor mounting board 510, one or more voltage sense (input) modules 504, one digital I/O power (output) relay 501, and one or more RJ11 connectors 513. Two or more pairs of wires 502, 503, 505, 506 exit the MIM 500. One pair of wires 502, 503 controls A/C power to the laundry machine. The second and additional pairs of wires are labelled sensor pairs 505, 506. In addition, the MIM contains an RJ11 connector 513 for using low voltage wire between the MIM 500 and the CIM, FIG. 5b. One RJ11 connector contains four low voltage lines. A plus five volt line 508 and 511 is connected in parallel to provides power to the sensor 504 and the power relay 501, respectively. A ground line 507 is also connected to the sensor. Independent digital I/O lines 509 and 512 are connected to the sensor 504 and power relay 501, respectively.

In FIG. 5b, the computer interface module (CIM) 514 contains a terminal board 515 with a DB-37 pin connector 516 for a DB-37 pin cable 517 between the CIM 514 and the computer's system unit 102 digital I/O board. It also contains multiple RJ11 connectors 523, 524, 525, 526 for interfacing multiple MIMs 500 to a single CIM 514. The common ground line 507 and plus five volt lines 508, 511 from the MIM's sensor 504 and power relay 501, respectively are connected through an RJ11 523–526 on the CIM 514 to a common ground terminal 519 and a plus five volts terminal 520 from the power supply 518. The digital I/O lines 512, 509 from the MIM's power relay 501 and sensor 504, respectively are connected through an RJ11 (i.e., 513, 523–526) to a CIM 514 digital relay terminal 521 and to a sensor terminal corresponding to a relay-sensor pair (527–530) on the computer's system unit digital I/O board via the DB-37 cable 517. One digital I/O board can operate as few as one machine and as many as forty eight machines.

Figure 5C:
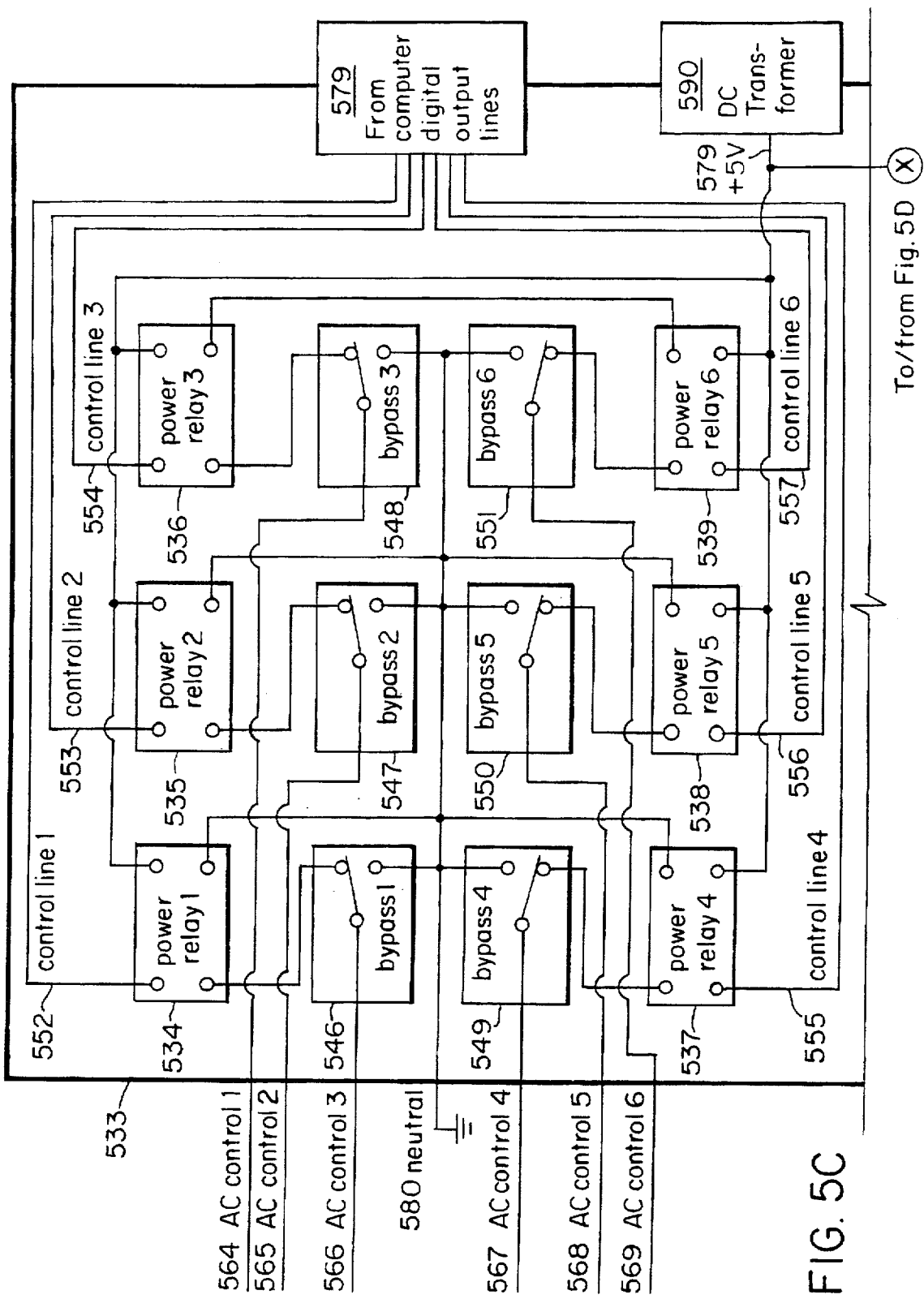
FIGS. 5c and 5d show a wiring diagram for a master control module (MCM).
Figure 5D:
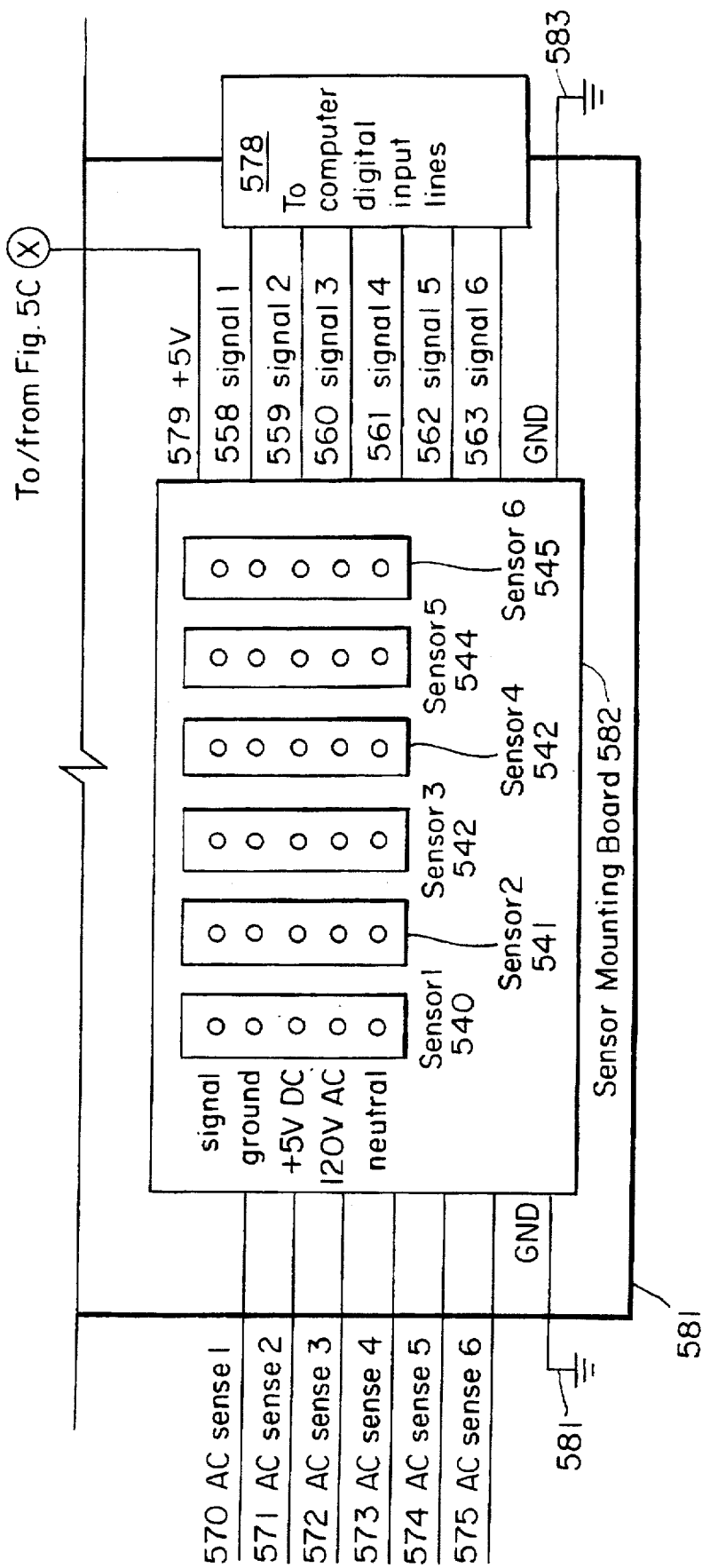

FIG. 5c represents an alternative embodiment of the invention in which the MIM FIG. 5a and the CIM FIG. 5b are combined into a master control module (MCM) 533. The power relays 534–539 and sensor modules 540–545 are wired into a MCM 533 located near the computer 102. The high voltage power relay wires 564–569 and sensor wires 570–575 from the laundry machines are wired directly to the power relays 534–539 and sensors 540–545, respectively. A common neutral wire 580, 581 is also connected to the high voltage terminals on the relays 534–539, the bypass switches 546–551, and the sensors 540–545. The digital control lines 552–557 to the power relays 534–539 and the digital sensor lines 558–563 to the voltage sensors 5401–545 are connected to the computer's system unit digital I/O board's output 577 and input 578 controllers, respectively. A DC transformer 590 supplies a common plus five volts 579 to the power relays 534–539 and sensors 540–545. The DC transformer 590 also supplies a common ground 583 to the sensor mounting board terminal 582. Single-pole switches 546–551 are wired in parallel with the power relays 534–539 to provide a means to manually bypass each of the power relays. Therefore, the MCM 533 permits a switchable manual override of the solid state power relay for each of the laundry machines in the event of computer or solid state relay component failure. In the manual override mode the laundry machines are freely available or coin-operated available (if machine is so equipped) because power to the outlet is on. The advantages of this system unit configuration are elimination of hardware in laundry machines which have limited control panel space to accommodate MIMs (FIG. 5a). In addition, higher security of the system is provided by direct high voltage wiring, maintenance of the sensors and relays is simplified, and customers can be given access to individual machines (via management controlled bypass switches) while maintenance is being performed on specific power relays.

A laundry system control program (FIG. 6) is a major component of the system. It is used to coordinate data from the other system components; e.g. the input device(s) 106, the laundry machines 110, 112, and the modem 116. The logic of one of many software implementations follows. A patron opens a session 600 by following the prompts 602 on the display FIG. 13. The patron chooses an appropriate medium 604 such as audio 606 or visual 608 prompts. All subsequent prompts and messages are in the medium chosen 604 and include in sequential order of operation-language prompts 610–618, user identification prompts 620, confirmation of a valid user ID 622, current balance 624, selection of functions 628, confirmation of execution of desired functions 630. Function requests include changing pass codes 632, section of automatic notification when laundry machine function is complete 634, machine use 636, and ending a session 638. A session is closed automatically 626 if an invalid user ID is used or the patron chooses to close a session 640.

Figure 7:
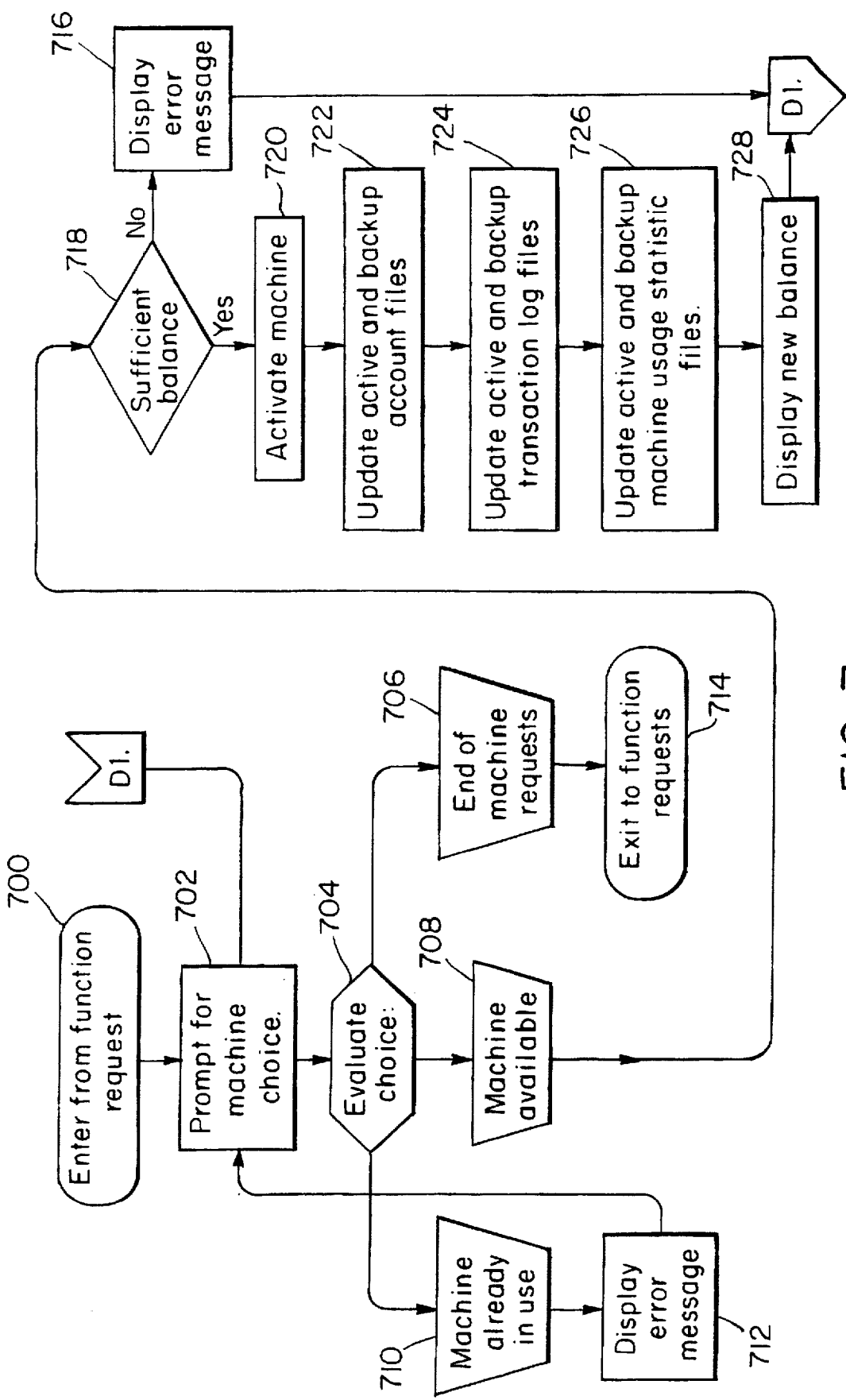
FIG. 7 shows an expanded flow chart of FIG. 6, box 636 to activate the laundry machines in accordance with the invention.

FIG. 7 shows the flow chart for controlling the function to use the machines. The patron enters a function request 636, 700 on an input device 106. The program prompts the patron to select the number of the laundry machine intended for use 702. The program evaluates the patron's choice 704 which may be a request to end machine use 706 resulting in termination of this function request 714 or a request to use an available machine 708. If the patron's machine selection is available 708 and there is sufficient balance 718 in the patron's account then the selected machine is activated 720, the accounting file 722 (a data file containing patron account balance information) is updated, the transaction log file 724 (a comma delimited history file which appends the date and time of machine use, machine number, machine type, machine cost, account number, account holder, account balance, account type) is updated, machine usage statistics files 726 (monthly and year-to-date) are updated, and the patron's new account balance is displayed 728 for 20 seconds (timed interval selectable). If the patron's machine selection is already in use 710 then an error message is displayed 712. If there is insufficient balance in the patron's account to operate the selected machine then an error message 716 is displayed and the function is denied.

Figure 8:
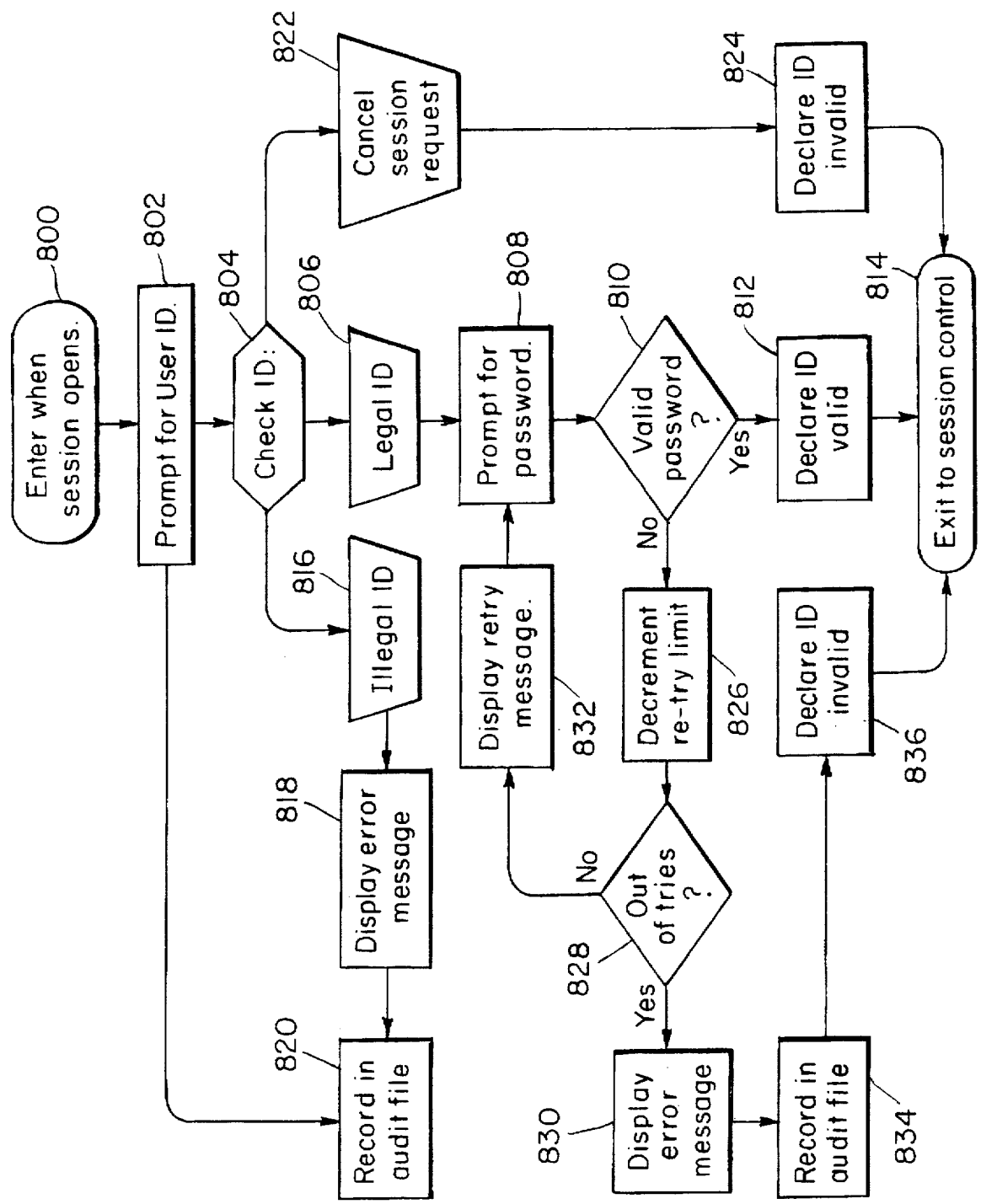
FIG. 8 shows an expanded flow chart of FIG. 6, box 620 to obtain information about the user's identification in accordance with the invention.

FIG. 8 shows the flow chart to get user identification. The patron opens the session 800 by using the input device 106 to respond to the prompts for user ID 802. The software checks the ID 804 and if it is a legal ID 806 prompts the patron for a pass code 808. The software checks the validity of the pass code 810 and if it declares the pass code valid 812 it exits to session control 814 (FIG. 7). If the ID is illegal 816, an error message is displayed 818 and the error is recorded in an audit file 820. A new prompt for user ID 802 is displayed. Alternatively, the patron can cancel a session request 822, the ID is declared invalid 824, and the routine is exited to session control 814. If the pass code is invalid then the software decrements a retry limit (usually three tries) 826, displays a retry message 830 and re-displays the prompt for pass code 808. When the retry limit is reached 828 an error message is displayed 832, the error is recorded in an audit file 834, the ID is declared invalid 836 and the programs exits to session control 814.

Figure 9:
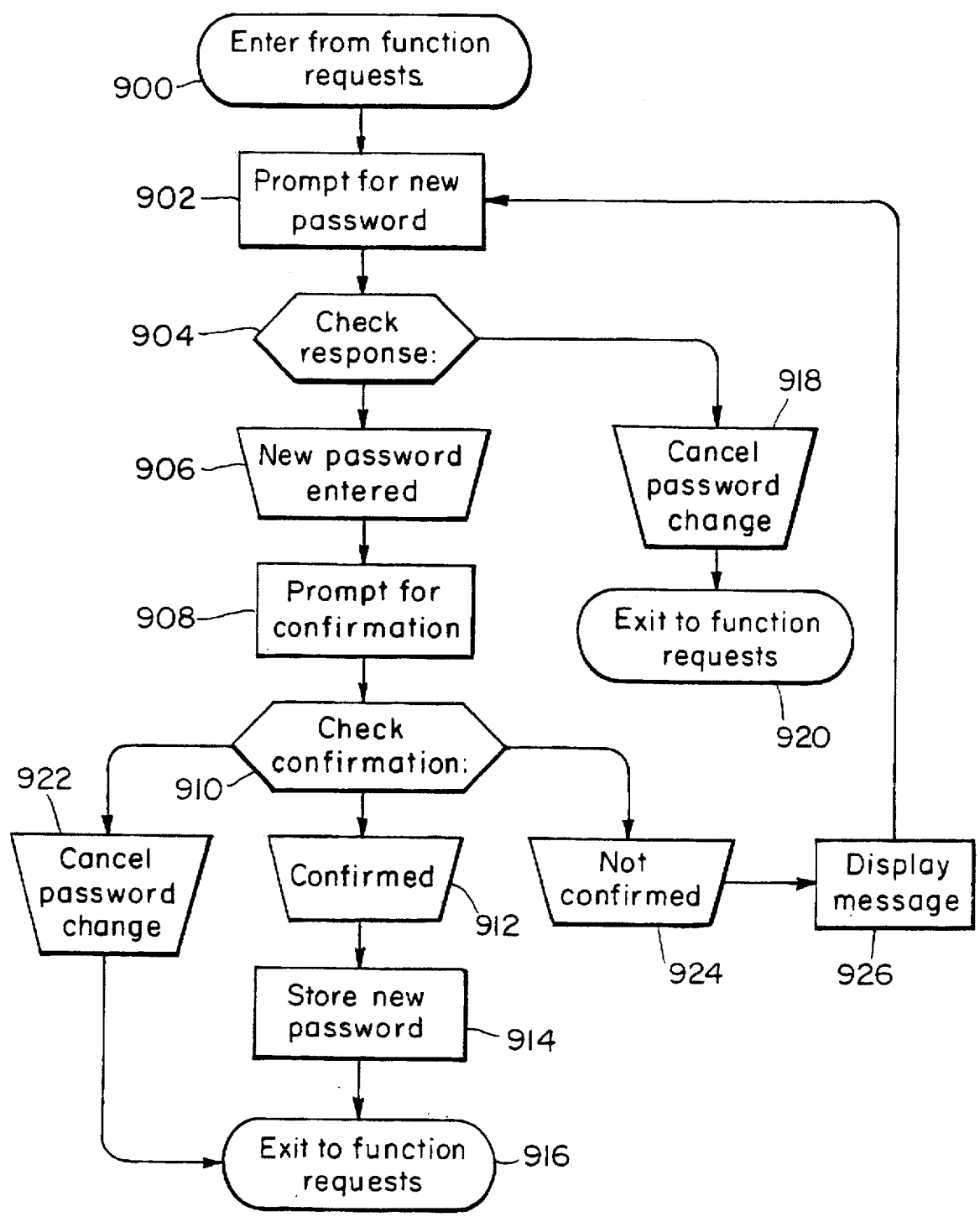
FIG. 9 shows an expanded flow chart of FIG. 6, box 632 to change the user's password in accordance with the invention.

FIG. 9 shows the flow chart to change a pass code. The patron uses an input device 106 to enter a subroutine from the function requests menu 632, 900. The patron responds to a prompt for a new pass code 902. The software checks the response 904 and a new pass code is entered 906 by the patron. The software then prompts for confirmation 908, the patron reenters the same pass code, and the software checks the confirmation 910. If the new pass code is confirmed 912 then the new pass code is stored 914 in a file and the routine exits the function requests subroutine 916. The patron can cancel the pass code change 918, 922 and exit the function request subroutine 920, 916 following the initial prompt for a new pass code 902 or following the confirmation check 910. If the confirmation check 910 is not confirmed 924 a message is displayed 926 and the patron is prompted for a new pass code 902.

Figure 10A:
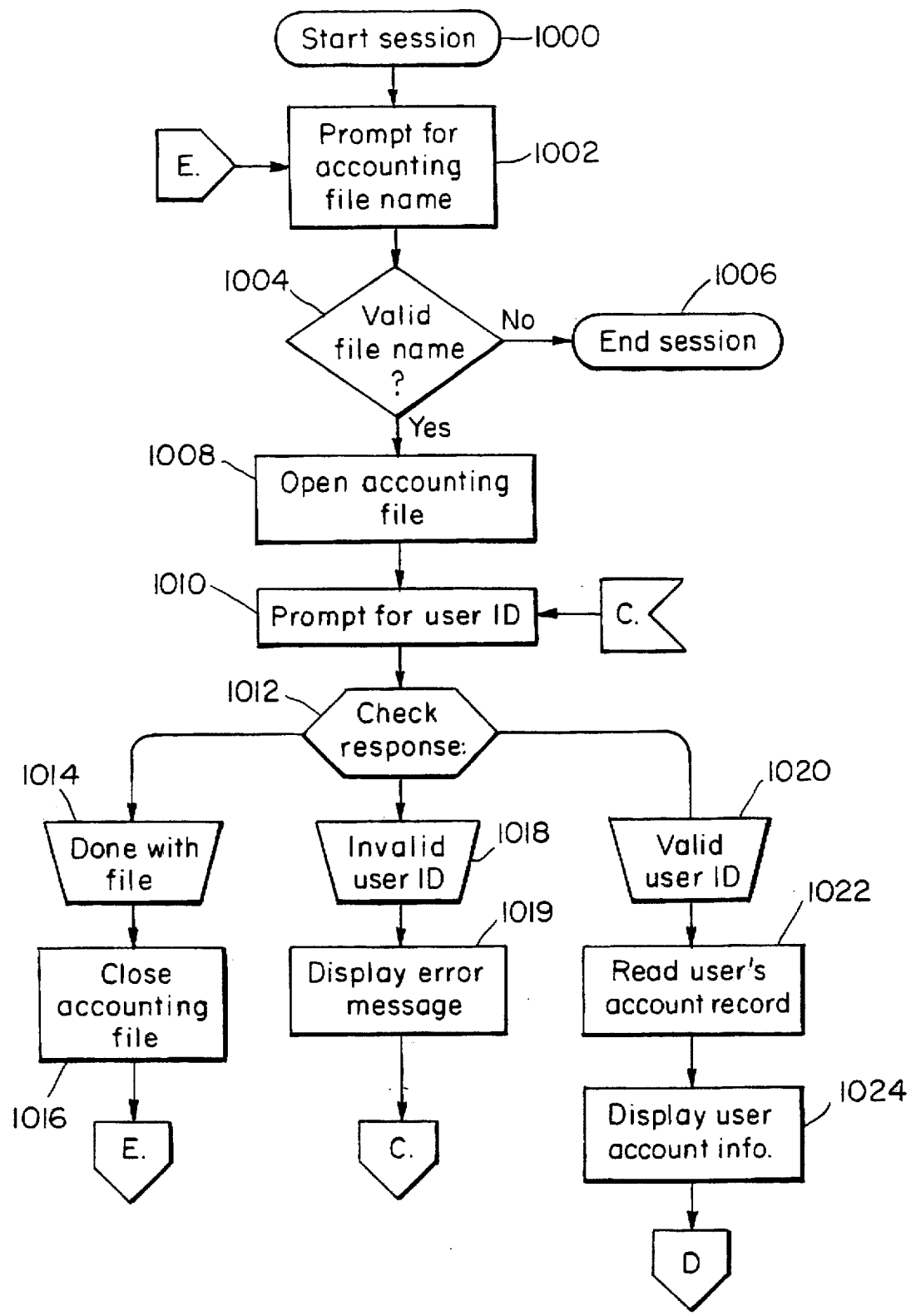
FIG. 10 shows a flow chart for a software program to manage a debit account implementation of the system.
Figure 10B:
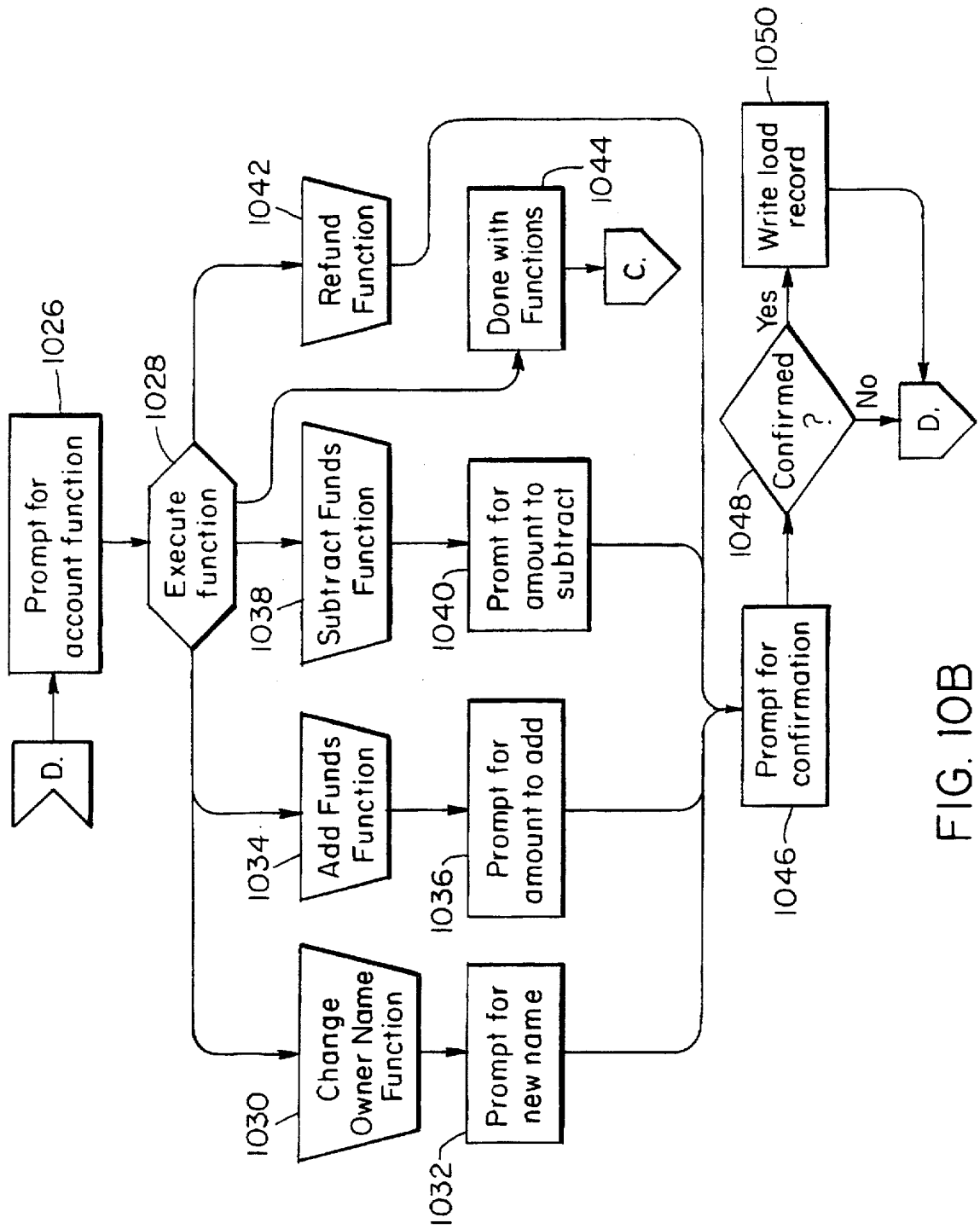

FIG. 10 shows the flow chart for remote management procedures of the invention. The manager opens the session 1000 by using an input device such as a modem 116 from a remote terminal to respond to the prompt requesting the accounting file name 1002. Entering an invalid file name 1004 ends the session 1006. Entering a valid file name 1004 will open the accounting file subroutine 1008. The manager is prompted for his/her user ID 1010. The manager can end the session 1012, 1014 which will close the accounting file 1016 and return the prompt for a valid accounting file name 1004. If an invalid user ID is entered 1018, an error message is displayed 1019 and the prompt for user ID 1010 reappears. If a valid user ID is entered 1020 then the software read's the user's account record 1022 and displays the user's account information 1024. The manager is prompted for an accounting function 1026 and the software executes one of the following functions 1028: change account owner's name 1030, add funds to patron's account 1034, subtract funds from patron's account 1038, quick refund a patron's account 1042 (e.g., one dollar, management selectable) or done with functions 1044. The software prompts the user for the new name 1032, amount to add 1036 or the amount to subtract 1040 from the patron's account, and prompts for confirmation to commit to the change 1046. If the manager confirms the changes 1048 then a write-load record is created 1050 followed by a new prompt for account function. The software re-displays the prompt for user (manager's) ID 1010.

Two way communication serves a variety of purposes including facilitating monitoring of the operational history of a particular machine including the amount of activity (i.e., number of cycles). Thus remote management access is part of an auditing system which can be employed by an operator of a commercial laundry establishment to monitor revenues generated, update account balances, and refund accounts.

When the management site activates the laundry facility computer by modem and signs on with the correct pass code, the remote site can perform all functions that the monitor in the laundry facility is capable of. In addition, this laundry site can be automatically called by a remote computer for transfer of all accumulated data (transaction logs 724, audit files 820, accounting files 1008) from the facility either daily, weekly, or monthly. File transfer operations can be performed in the background without interfering with the operation of the laundry machines or the customer's computer station 102. Management entry to customer account data is restricted by pass code 1010 access.

Remote access also permits remote auditing and allows the operator to display or print audit reports. These reports include data on cash in a customer's account, apparatus cycles, and time and usage data for each apparatus. These reports are available for each apparatus individually, summaries for each type of apparatus (e.g., washers), and for all apparatus combined (e.g., washers 110, dryers 112, vending machines 120). Information about machine usage can be viewed to verify when a laundry machine malfunctioned.

The time usage data can show how often the apparatus is being used during specific hours of the day and during the week. The apparatus cycle information for individual machines can report which machines in the room are used most often and thus may require preventative maintenance sooner. Remote auditing also logs repeated failed access attempts to particular accounts either to aid a customer who needs assistance at the computer station or to identify misuse or abuse.

Remote access allows the manager to change specific operating parameters of the total system and of an individual apparatus. System parameters comprise items such as system pass codes, operations settings for system sensors, telephone numbers to call, as well as rate settings that may be keyed to date, time, and customer categories (eg. elderly or rental customer discounts). Additionally, remote management access permits updates to commercial information displayed on the monitor 108 at the laundry site.

Figure 13:
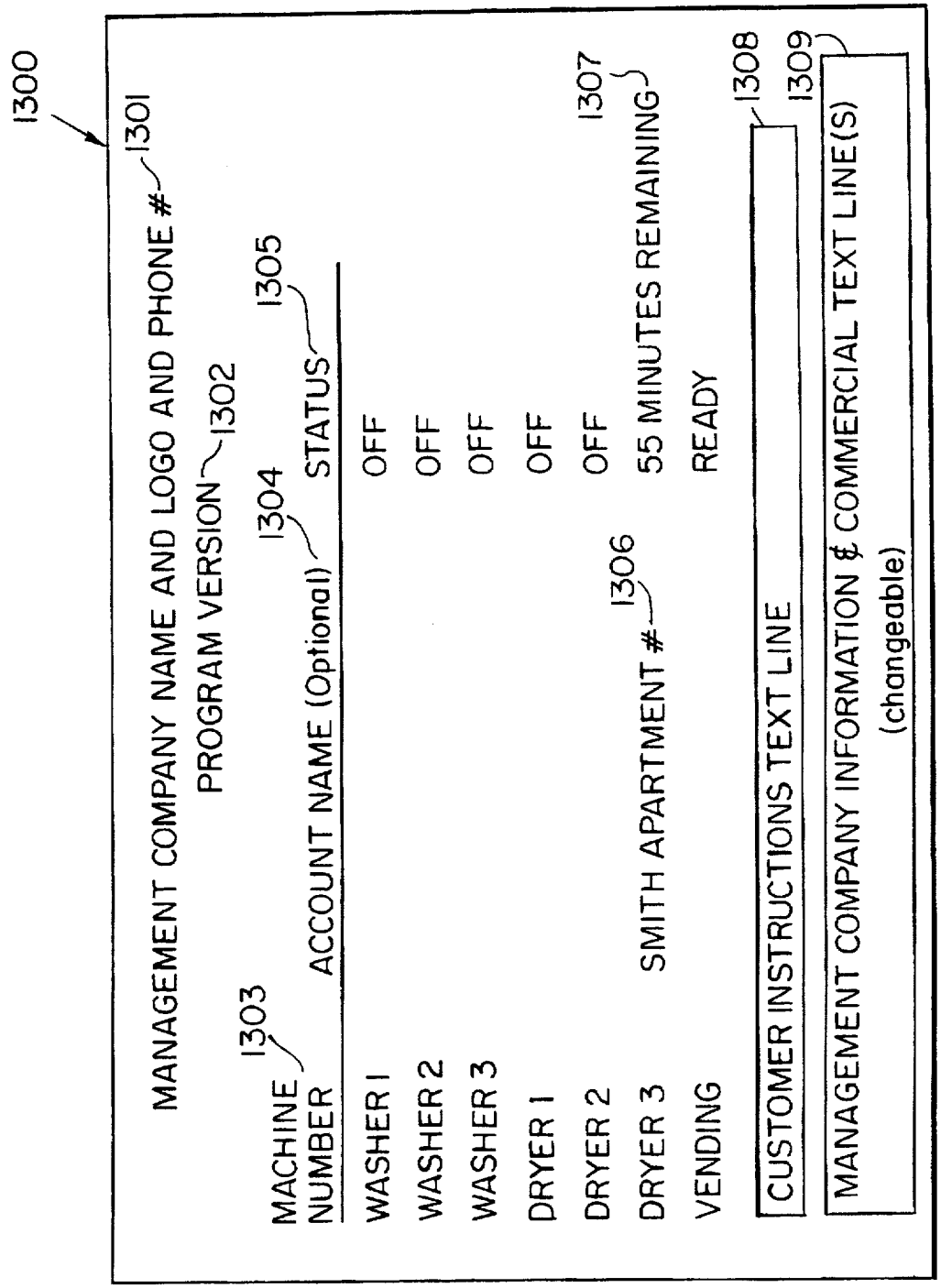
FIG. 13 shows an example of a computer screen layout in accordance with the invention.

FIG. 11 shows the software routine for timed interval machine checking. This routine monitors a countdown timer for laundry machine use, automatically loads new patron account information sent by the management via modem into the accounting, transaction, and statistics files, turns off machine power, and notifies patrons when the laundry machines turn off. The system is awakened 1100 by the machine clock, once per second. If the software detects an active session 1102, it decrements the user prompt countdown timer 1104. If there is no input activity before the timer (~30 seconds, selected by management) is up 1106, the software cancels the user prompt 1108 on the display 108. The software checks laundry machine sensors and timers 1110. If there are no machines to check then the software determines if an accounts update load file 1112 is present in the master directory. This system enable the remote updating of user account data that has been stored in memory to reflect payments by the user on other transactions relating to the users account. If there is no accounts update file 1112 present the program enters an idle or sleep mode 1118. If there is an accounts update load file 1112 present then the software loads the new account information 1114 into the master accounting file and transaction log file, deletes the account load file 1116, and enters the sleep mode 1118. If there are active machines detected 1110 then the software chooses the next unchecked machine 1120. The software determines if a laundry machine is using a computer timed cycle or is in a grace period (~ five minutes, selected by management) 1122. When the timer decrements to zero 1124 and the laundry machine timer is up 1126 then the software turns the power to the laundry machine off 1132 and updates the display 1130 (FIG. 13). If the patron selected the feature for auto-notification 634, 1134 then the software controls a device (e.g., modem 116) to send the patron notification by voice phone, facsimile, or e-mail 1136, FIG. 2. If the laundry machines count down timer 1124 is not up 1126, then the software checks a laundry machine definition file to determine if the laundry machine is on a self-governing cycle 1128. If the laundry machine is not on a self governing cycle then the display is updated 1130. If the laundry machine is on a self governing cycle 1128 then the software checks the status of the cycle's sensor 1138. If the cycle has become inactive 1140 then a grace period timer assigned to the laundry machine 1142 decrements 1144 and updates the display 108. If there is no grace timer 1142 then the power to the machine is turned off 1132 as soon as the sensor detects an inactive cycle. If the laundry machine cycle is not inactive 1140 then the display 1130 is updated with the new time remaining in the laundry cycle FIG. 13.

A software implementation on a PC compatible computer can support timer interrupt signals of one second or less and supports keyboard interrupts generated by human input at a keypad 106. The program uses the internal clock to countdown machine cycle times and to notify itself to check the states of the laundry machine sensors at one second intervals. This arrangement has proven very adequate for a small laundry room.

Figure 12:
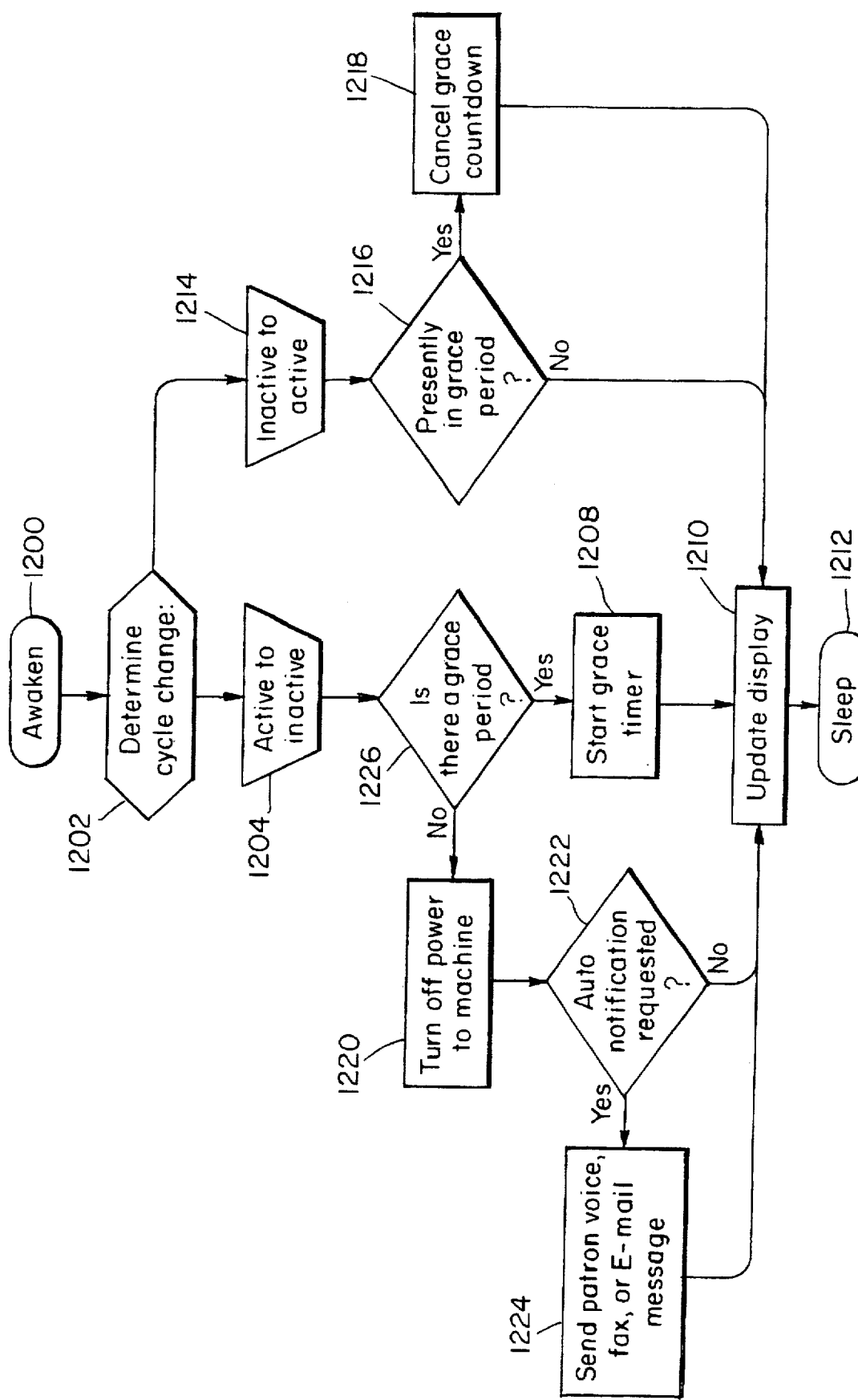
FIG. 12 shows a flow chart illustrating a sensor interrupt initiated method for checking laundry cycle status in a software program controlling laundry machines through the machine and computer interface modules.

FIG. 12 shows a more sophisticated arrangement in which the control program would respond to a hardware signal generated by a change in a sensor's state rather then checking each sensor at short fixed time intervals (i.e., FIG. 11). A change in laundry machine sensor status awakens 1200 the computer. The software determines the change in the laundry machine cycle 1202. If the sensor became inactive 1204 and if there is a grace timer associated with the laundry machine 1206 then the grace timer 1208 begins, the display 1210 (FIG. 13) is updated and the computer returns to its sleep mode 1212. If there is no grace period 1206 assigned to a laundry machine then the power to the laundry machine is turned off 1220. If auto-notification was requested 1222 then the patron is sent a voice, facsimile, or e-mail message 1224. FIG. 2 and the display is updated 1210. If the cycle change 1202 becomes active 1214 while the system is in a grace period 1216 then the grace period countdown is canceled 1218 and the display is updated 1210.

Figure 6A:
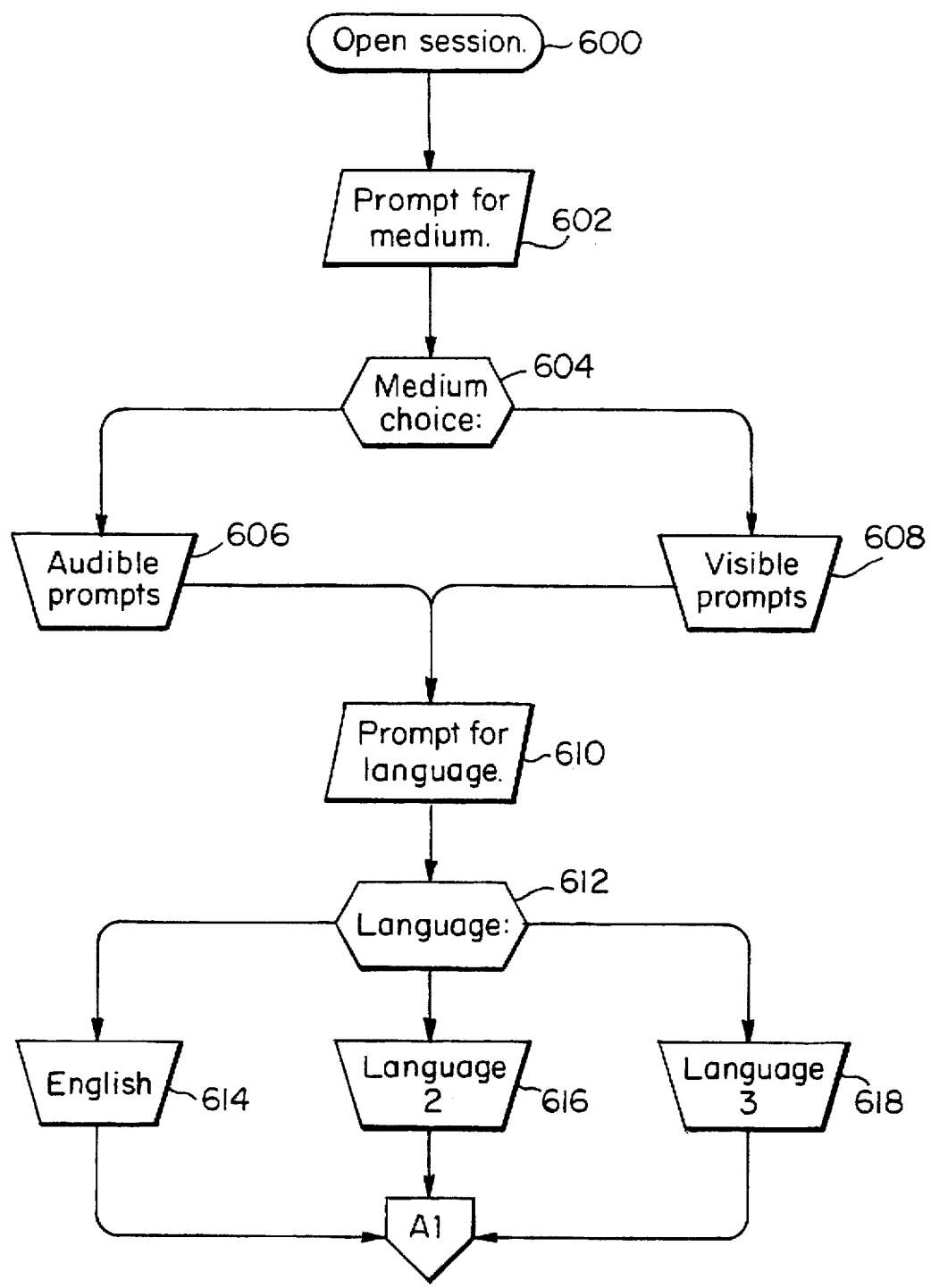
FIG. 6 shows an overview of a software program that controls the user session in accordance with the invention.
Figure 6B:
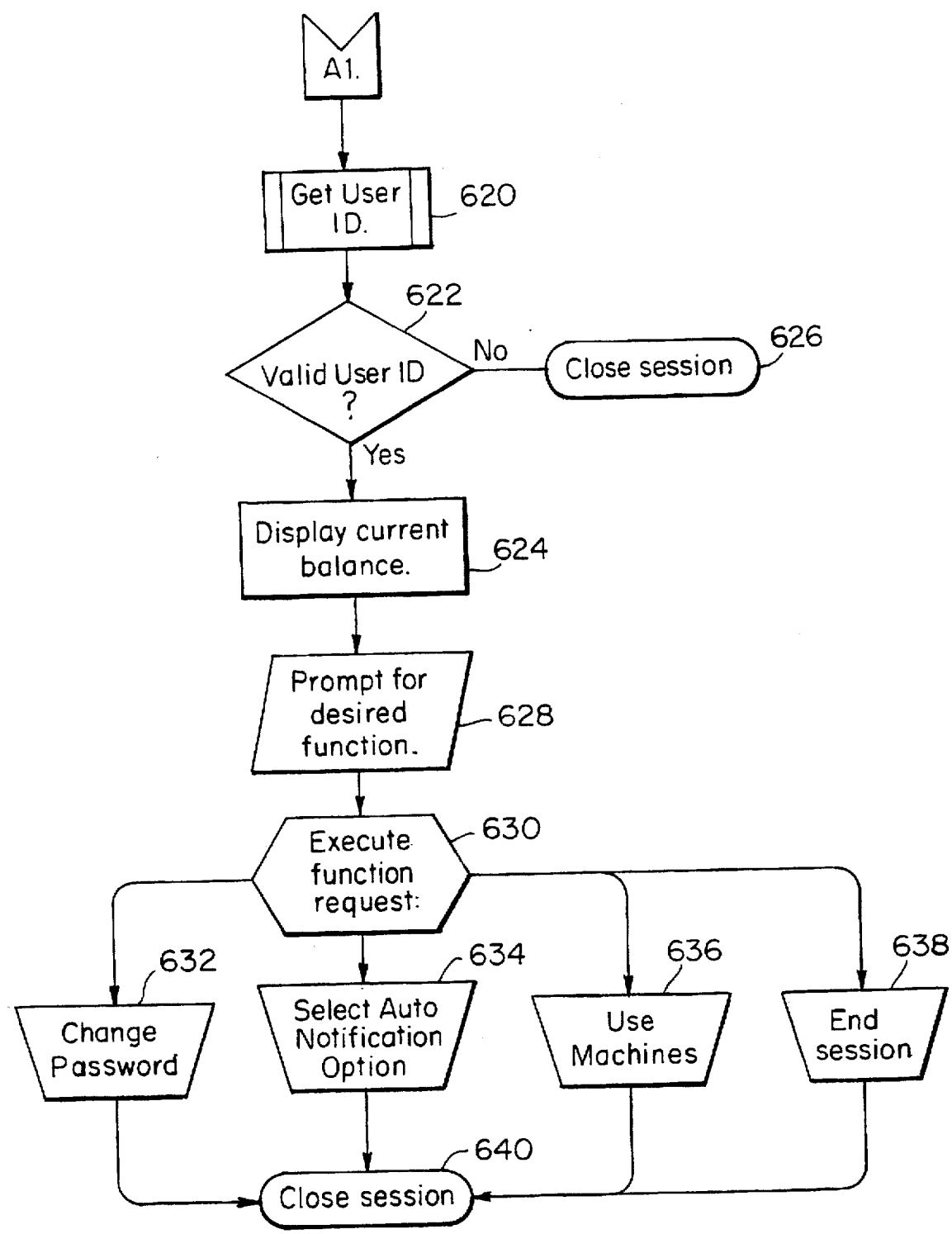

FIG. 13 illustrates a simple configuration of the display screen 1300. The laundry management company name 1301, commercial information text 1309, machine type 1303, and machine status 1305 (e.g., off, or cycle time remaining) are displayed continuously. These text lines can be customized remotely (FIG. 10) by the management company or control user. Account name 1304 can be optionally displayed. Customer instructions 1308 are displayed during an active session (FIG. 6). The display options typically are text lines for computers using one operating system and combinations of text and graphics for computers capable of using a pull down menu operating environment. Alternatively, screen icons can be displayed which the machine use can select and thereby choose different machine options. In a more sophisticated configuration, a graphical screen layout of the laundry room (e.g., FIG. 1) or other pictorial or schamatic representation of the different machines in the system and a touch screen can also allow the display screen to serve as an input device.

Equivalents

Those skilled in the art will know, or be able to ascertain using no more than routine experimentation, many equivalents to the specific embodiments or the invention described herein. These and all other equivalents are intended to be encompassed by the following claims.

What is claimed is:

1. A method of modifying a laundry machine for computer controlled operation comprising:

providing one or more laundry machines, each laundry machine having a power source connection and a cycle active circuit;

providing a programmable personal computer having a display and a user interface;

providing a laundry system controller connected to the personal computer, the controller having output ports to control power delivery to each of the one or more laundry machines through the power source connection of each machine, the controller further comprising a sensor system connected to a sensor connector for each laundry machine; and connecting a sensor connector to each of the one or more laundry machines at the cycle active circuit of each of the one or more laundry machines.

2. The method of claim 1 wherein step of providing a laundry system controller further comprises providing a plurality of power relays, each power relay being connected to the power source connection of each laundry machine.

3. The method of claim 1 further comprising providing a plurality of sensors, each sensor being connected to the cycle active circuit of one of the laundry machines, each sensor emitting sensor data signal to an input control circuit of the computer.

4. The method of claim 1 wherein the step of providing one or more laundry machines comprises providing a washing machine and a drying machine.

5. The method of claim 1 further comprising providing a plurality of cam-operated laundry machines.

6. The method of claim 1 further comprising providing a modem connected to the personal computer.

7. The method of claim 1 further comprising programming the personal computer with user account and auditing software.

8. The method of claim 1 further comprising providing an input device connected to the computer, the input device being selected from the group consisting of a keyboard, a keypad, a card reader, a bar code reader and a touch screen.

9. The method of claim 1 further comprising connecting the computer to a network.

10. A computer controlled laundry system comprising:

a plurality of laundry machines, each laundry machine having a power source connection and a cycle active circuit;

a personal computer having a display, a user interface, and a memory that stores user information, the computer further comprising a programmable software control system;

a laundry system controller connected to the personal computer, the controller having output ports to control power delivery to each of the plurality of laundry machines through the power source connection of each machine, the controller further comprising a sensor system connected to a sensor connector for each laundry machine such that a sensor connector is connected to each of the plurality of laundry machines at the cycle active circuit of each laundry machine.

11. The system of claim 10 wherein the laundry system controller further comprises a plurality of power relays, each power relay being connected to the power source connection of each laundry machine.

12. The system of claim 10 further comprising an input control circuit of the computer such that each sensor emits control signals to the input control circuit.

13. The system of claim 10 wherein the user interface comprises an input device selected from the group consisting of a keyboard, a keypad, a card reader, a bar code reader and a touch screen.

14. The system of claim 10 further comprising a modem to connect the computer to a remote computer station.

15. The system of claim 10 further comprising telephone connection to a telephone system.

16. A method for controlling a computer operated laundry system comprising:

providing a programmable personal computer having a display, a user interface and a modem that connects the computer to a remote location;

providing a laundry machine having a power source connection and a control circuit;

providing a controller connected to the personal computer, the controller being connected to the laundry machine such that the controller actuates delivery of electrical power to the laundry machine;

programming the computer with user account, auditing and billing software;

actuating use of the laundry system with the user interface to identify a user and record event data;

actuating the laundry machine;

monitoring laundry machine operation with the controller; and remotely updating user account data stored in a memory in the computer.

17. The method of claim 16 further comprising connecting the personal computer to a telephone system such that the laundry system user can communicate with the personal computer.

18. The method of claim 16 further comprising programming the computer with a plurality of laundry system user languages.

19. The method of claim 16 wherein the user account software comprises user credit refund and debit information and user identification information.

20. The method of claim 16 wherein the monitoring step further comprises sensing laundry machine operations with a sensor in the controller that is connected to the laundry machine control circuit and argumenting the machine cycle period.

* * * * *